(12) United States Patent
Seppänen (10) Patent No.: US 10,938,865 B2
(45) Date of Patent: Mar. 2, 2021

(54) MANAGEMENT OF SUBSCRIBER IDENTITY IN SERVICE PROVISION

(71) Applicant: Telia Company AB, Solna (SE)

(72) Inventor: Juho Seppänen, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/508,182

(22) Filed: Jul. 10, 2019

(65) Prior Publication Data

US 2020/0021626 A1    Jan. 16, 2020

(30) Foreign Application Priority Data

Jul. 10, 2018   (FI) .................................... 20185636

(51) Int. Cl.
*H04L 29/06* (2006.01)
*H04W 12/02* (2009.01)

(52) U.S. Cl.
CPC ...... *H04L 65/1069* (2013.01); *H04L 63/0421* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 9,003,302 B1* | 4/2015 | Wageman | H04L 65/403 715/753 |
| 9,020,113 B2* | 4/2015 | Noldus | H04M 15/10 379/114.26 |
| 9,723,157 B2 | 8/2017 | Brown | |
| 2003/0041108 A1* | 2/2003 | Henrick | H04L 63/02 709/205 |
| 2008/0084832 A1* | 4/2008 | Haruna | H04M 3/42008 370/260 |
| 2010/0312903 A1* | 12/2010 | Miyata | H04L 63/0421 709/228 |
| 2011/0179180 A1* | 7/2011 | Schleifer | H04L 12/1818 709/227 |

(Continued)

FOREIGN PATENT DOCUMENTS

WO    2018080243 A1    5/2018

OTHER PUBLICATIONS

Finnish Search Report (FI-SR), dated Jan. 23, 2019, from corresponding Finnish application No. FI 20185636.

(Continued)

*Primary Examiner* — Joshua Joo
(74) *Attorney, Agent, or Firm* — Nixon & Vanderhye (57) ABSTRACT

Disclosed is a method for preventing a disclosure of an identity of a subscriber A to a subscriber B in a communication session including a voice call connection and a multimedia data sharing session. In the method it is performed, by a server, at least one operation for preventing the disclosure of the identity of the subscriber A in a context of an establishment of a voice call connection, and in response to a receipt of a request to share multimedia data from one of the communicating parties, it is established the multimedia data sharing session between the subscriber A and the subscriber B by indicating to the subscriber B that the server is another party of the multimedia data sharing session. Also disclosed is a server and a computer program product.

18 Claims, 4 Drawing Sheets

(56) References Cited

U.S. PATENT DOCUMENTS

| | | | |
|---|---|---|---|
| 2011/0179181 A1 | 7/2011 | Elz | |
| 2012/0028598 A1 | 2/2012 | Bakker et al. | |
| 2012/0135775 A1* | 5/2012 | Drozt | H04L 65/403 455/518 |
| 2012/0304250 A1* | 11/2012 | Hu | H04W 12/0802 726/1 |
| 2013/0259229 A1* | 10/2013 | Thumparthy | H04W 12/02 380/247 |
| 2015/0181027 A1* | 6/2015 | Mossner | H04M 3/42348 379/142.04 |
| 2015/0319141 A1* | 11/2015 | Jang | H04L 51/046 726/26 |
| 2016/0080559 A1* | 3/2016 | Mufti | H04L 65/1006 455/416 |
| 2017/0180432 A1 | 6/2017 | Gjärdman et al. | |
| 2017/0295281 A1 | 10/2017 | Lasso et al. | |
| 2019/0044984 A1* | 2/2019 | Chiang | H04L 65/1089 |

OTHER PUBLICATIONS

Carla, L. et al. L Te enhancements for public safety and security communications to support group multimedia communications. IEEE Network, [online], Jan. 25, 2016, vol. 30, No. 1, pp. 80-85, [retrieved on Jan. 16, 2019]. Retrieved from <https://ieeexplore.ieee.org/document/7389835>, <DOI:10.1109/MNET.2016.7389835> the whole document (Cited in the FI-SR).

3GPP TS 22.173 V16.0.0 (Jun. 2018); IP Multimedia Core Network Subsystem 4 (IMS) Multimedia Telephony Service and supplementary services; Stage 1 (Release 16). [online], Jun. 23, 2018, [retrieved on Jan. 21, 2019]. Retrieved from <http://www.3gpp.org/ftp/specs/archive/22_series/22.173/22173-g00.zip>, the whole document; in particular, section 8.2.2.3 (Cited in the FI-SR).

* cited by examiner

MANAGEMENT OF SUBSCRIBER IDENTITY IN SERVICE PROVISION

TECHNICAL FIELD

The invention concerns in general the technical field of telecommunications. More particularly, the invention concerns management of subscribers in a communication network.

BACKGROUND

Modern applications in a field of telecommunication enable a provision of digital content to a caller in a context of a voice call. For example, calling subscriber and the called subscriber may be willing to share content associated to the call for enriching the communication session. The shared content may e.g. be video content, voice content, textual content or anything similar. The sharing of content may occur prior to an establishment of the call, during the call or after the call.

An implementation of the service enabling the sharing of the content in relation to the call is based on a server configured to provide the service. Basically, the idea is that the communication network, such as a mobile communication network, checks, in response to a receipt of the call setup, if the subscriber, or subscribers, being parties of the call have activated the content provision service and if that is the case information on the call setup is conveyed to the server for initiating the content sharing. The content may e.g. be pre-stored in storage accessible to the server and retrieved from the storage e.g. by means of a subscriber identity as a parameter for the retrieval. The application of the subscriber identity, or subscriber identities, in the context of the service may even enable individual content provision between the communicating parties, because the content provision service may be implemented so that the subscriber willing to share the content may define on a content basis to whom the content in question is to be shared.

An example of the above-described service is disclosed in a document U.S. Pat. No. 9,723,157 B2. There a solution for sharing multimedia content between the calling subscriber and the called subscriber is disclosed. In the solution it is disclosed aspects in which a selection of the content provided to the calling party is dependent on if the calling party is known to the called part or not. The determination if the calling party is known or not may be performed by comparing the received telephone number from the calling party to stored numbers in a contact list of the called party.

The above-described service implementation has a drawback in a situation that a subscriber identity of the calling subscriber is not received in an entity deciding if the content provision service is activated or not. This kind of situation may occur when the calling subscriber has indicated to the telecom operator that his/her subscription identity, such as MSISDN, shall be kept secret i.e. not conveyed along the call setup or is indicated to be not shown to the user or applications of the device. Naturally, this may also occur as a result of an operation that the subscription identities are not, for any reason, conveyed in the signaling between the parties, or any other entities, such as a server implementing the content provision service so that the information is delivered between the parties in one way or another. In this kind of situation, the server implementing the content provision service may not retrieve the content to be shared between the parties in questions and the service provision fails. Naturally, the subscriber identity is delivered in the network for enabling the setup of the call as well as for any other purposes, such as charging purposes.

Hence, there is need to introduce inventive solutions which mitigate at least in part the above described situation in which the subscriber identity is not to be utilized by at least one terminal device of at least one communicating party.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a server and a computer program product for preventing a disclosure of an identity of a subscriber to another subscriber in a communication session.

The objectives of the invention are reached by a method, a server and a computer program product as disclosed below.

According to a first aspect, a method for preventing a disclosure of an identity of a subscriber A to a subscriber B in a communication session comprising a voice call connection and a multimedia data sharing session established between a subscriber A and a subscriber B is provided, the method comprising: performing, by a server in response to a receipt of a voice call connection request from the subscriber A, at least one operation for preventing the disclosure of the identity of the subscriber A to the subscriber B in a context of an establishment of a voice call connection, and in response to a receipt of a request to share multimedia data from one of communicating parties, establishing the multimedia data sharing session, by the server, between the subscriber A and the subscriber B, the multimedia data sharing session is established by indicating to the subscriber B that the server is another party of the multimedia data sharing session.

A step of performing at least one operation may comprise: detecting, by the server, based on the call connection request that the subscriber identity of the subscriber A is not disclosable to the subscriber B. The detection may be based on an indicator carried in the call connection request, the indicator indicating a privacy of the subscriber A. For example, the indicator may be Calling Line Identification Restriction, CLIR.

The detection may also be performed by inquiring a privacy of the subscriber A from data storage in response to the receipt of the call connection request.

Moreover, the step of performing at least one operation may comprise a removal of the identity of the subscriber A from the call connection request and establishment of a data record in data storage at least identifying the subscriber A and the subscriber B as parties of communication.

The step of performing at least one operation may comprise confirming that the call connection request carries an indication on the privacy of the subscriber A.

The method may further comprise, in response to the call establishment, a step of receiving a capability discovery request from the subscriber B for determining a capability of the subscriber A to support the multimedia sharing session. The capability discovery request may be generated, by the server, to the subscriber A in response to a determination of the identity of the subscriber A from one of the following: from the received capability discovery request, from the data record stored in the data storage.

The method may further comprise, in response to a receipt of a capability response from the subscriber A indicating the capability of the subscriber A by generating a capability response indicating the capability of the subscriber A to the subscriber B by not including the identity of the subscriber A to the generated capability response.

The capability of the subscriber A to support Rich Communication Services, RCS, protocol may be determined in the capability discovery.

The multimedia data sharing session may be implemented with Rich Communication Services, RCS, protocol.

According to a second aspect, a server is provided, the server comprising: at least one processor; at least one memory including computer program code; wherein the at least one memory and the computer program code configured to, with the at least one processor, cause the server to perform: at least one operation, in response to a receipt of a voice call connection request from a subscriber A, for preventing a disclosure of an identity of the subscriber A to the subscriber B in a context of an establishment of a voice call connection, and in response to a receipt of a request to share multimedia data from one of the communicating parties, establishing a multimedia data sharing session between the subscriber A and the subscriber B, the multimedia data sharing session is established by indicating to the subscriber B that the server is another party of the multimedia data sharing session.

The server may be configured to, during performing the at least one operation, detect, based on the call connection request, that the subscriber identity of the subscriber A is not disclosable to the subscriber B. The server may be configured to perform the detection based on an indicator carried in the call connection request, the indicator indicating a privacy of the subscriber A.

The server may be configured to perform the detection by inquiring a privacy of the subscriber A from data storage in response to the receipt of the call connection request.

Moreover, the server may be configured to perform the at least one operation by removing the identity of the subscriber A from the call connection request and establishing a data record in data storage at least identifying the subscriber A and the subscriber B as parties of communication.

The server may be configured to perform the at least one operation by confirming that the call connection request carries an indication on the privacy of the subscriber A.

The server may further be configured to, in response to the call establishment, receive a capability discovery request from the subscriber B for determining a capability of the subscriber A to support the multimedia sharing session. The server may be configured to generate the capability discovery request to the subscriber A in response to a determination of the identity of the subscriber A from one of the following: from the received capability discovery request, from the data record stored in the data storage.

According to a third aspect, a computer program product for preventing a disclosure of an identity of a subscriber A to a subscriber B in a communication session comprising a voice call connection and a multimedia data sharing session established between a subscriber A and a subscriber B is provided which computer program product, when executed by at least one processor, cause a server to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
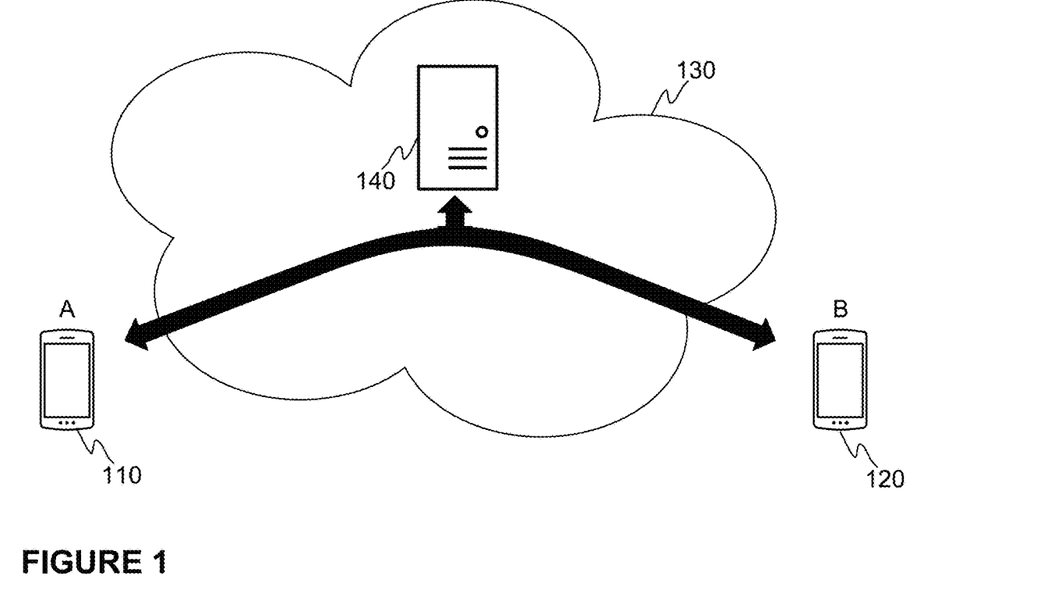
FIG. 1 illustrates schematically a communication system implementing the invention.

FIG. 1 schematically illustrates an example of a communication system, or a communication environment, into which the present invention may be implemented to. The communication system comprises a subscriber A 110 and a subscriber B 120 communicatively coupled to each other over a communication network 130, such as a mobile communication network. The communication between the subscriber A 110 and the subscriber B 120 is arranged to be performed at least in part with a support of a server 140. The server 140 may be configured to perform one or more operations by means of which it is possible to arrange that an identity of the subscriber A 110 is not communicable to the subscriber B. A blocking that the identity of the subscriber A 110 is not communicated to the subscriber B 120 refers at least to an implementation in which the subscriber B 120, i.e. the user of the device operating as the subscriber B 120, does not receive an identity information of the subscriber A 110. This may e.g. refer to that one or more applications, such as a call application, executed in the subscriber B 120, e.g. in response to a receipt of a call connection request, does not derive the identity of the subscriber A 110 in a manner that it is disclosed, in one way or another, to the user of the device operating as the subscriber B 120. The present invention provides a mechanism to provide content between the subscriber A 110 and the subscriber B 120 in such a manner that at least one of the subscribers may maintain a privacy i.e. the identity of the subscriber does not become known by the user of the device representing a subscriber, such as a subscriber B 120, in the communication network. The server 140 disclosed in the FIG. 1 shall be understood to comprise one or more server devices by means of which the present invention may be implemented to. In a distributed solution each server 140 may be configured to implement a dedicated task for achieving the result of the present invention.

Figure 2:
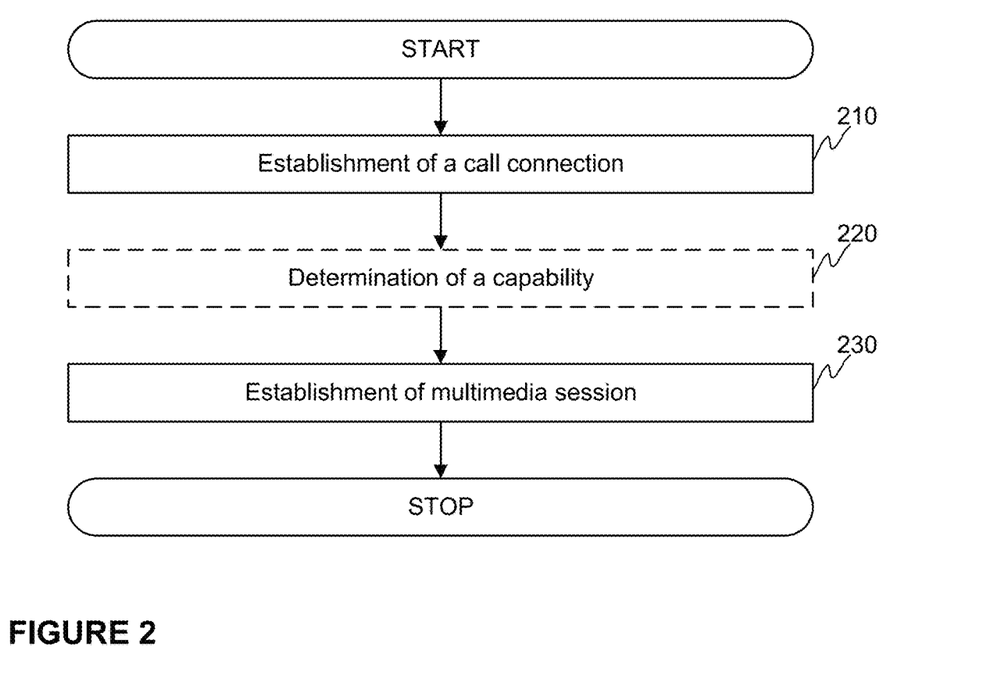
FIG. 2 illustrates schematically a method according to an embodiment of the invention.

FIG. 2 illustrates schematically an example of a method according to an embodiment of the invention in which the identity of the subscriber A 110 may be maintained hidden to the subscriber B 120. The method starts so that a first subscriber, i.e. subscriber A 110, initiates a call setup towards a second subscriber, i.e. subscriber B 120, over a mobile communication network 130 so that the call connection request is conveyed through a server 140. For describing at least some aspects of the present invention it is assumed that the call connection request is interpreted by the server 140 so that the subscriber A 110 is willing to maintain a privacy i.e. it is indicated that a subscriber identity of the subscriber A 110 is not allowed to be shown the subscriber B 120. The interpretation by the server 140 may be based on a detection of an indicator included in the call connection request, such as a predetermined value in a request, which indicator is configured to indicate if the privacy of the subscriber A 110 is to be maintained. Alternatively or in addition, the server 140 may be configured to obtain an identity of the subscriber A 110 from the call connection request and to perform an inquiry to data storage, such as to a database, accessible to it for inquiring if the privacy of the subscriber A 110 shall be maintained. In response to such a detection the server 140 may be configured to generate a call connection request to the subscriber B 120 in such a manner that the privacy of the subscriber A 110 may be maintained. According to an embodiment the generation of the call connection request by the server 140 may refer to a procedure that the server removes the identity of the subscriber A 110 from the call connection request and establishes a data record in data storage, i.e. a memory, which data record identifies the call connection request and the parties in it i.e. the subscriber A 110 and the subscriber B 120. Moreover, it may manipulate the call connection request so that it carries information indicating the privacy of the subscriber A 110 shall be maintained in the call connection. In another embodiment the server 140 may be configured to detect that the call connection request carries an indication that the subscriber A 110 is willing to maintain his/her privacy. If the indication is missing and the server 140 has found out the requirement of the privacy e.g. through an inquiry to data storage, the server 140 may be configured to add such an indication in the call connection request. In other words, the server 140 may be configured to perform an operation preventing the subscriber B 120, and especially the user of the terminal device of the subscriber B 120, to access the identity information of the subscriber A 110. In response to a receipt of the call connection request from the server 140, through network elements of a mobile communication network, the subscriber B 120 may be configured to detect that the identity of the subscriber A 110 may not be disclosed to the user of the terminal device of the subscriber B 120. As said this may be detected on the absence of the identity information in the call connection request received by the subscriber B 120 or on the basis of an indication in the call connection request indicating that the subscriber A 110 is willing to maintain his/her privacy. In other words, the terminal device of the subscriber B 120 does not disclose, such as by displaying, the identity of the subscriber A 110 to the user of the terminal device of the subscriber B 120. However, the call connection request is indicated to the subscriber B 120 with one or more operations, such as with audible and/or visual alert signal, specific to the terminal device in accordance with a setting defined in the terminal device. The user may either accept or decline the call connection request. For the purpose of describing at least some aspects of the present invention it is now assumed that subscriber B 120 accepts the call connection request. In response to an acceptance of the call connection request an indication on this is conveyed to the mobile communication network, i.e. to network elements being involved in the call setup, and to the subscriber A 110. Moreover, the indication of an established voice call connection may be conveyed to the server 140.

Next, in some embodiment of the invention, since one portion of the communication session between the subscriber A 110 and the subscriber B 120 is a sharing of multimedia data, such as sharing a document or video image, there is need to determine a capability of at least one terminal device being a party of the session. For example, the second party, i.e. the subscriber B 120, may be willing to share multimedia data and the subscriber B 120 may be configured to initiate so-called capability discovery determination 220 towards the subscriber A 110. Alternatively, it may be the subscriber A 110 who initiates the capability discovery and is the party willing to share the multimedia data. In case the sharing of multimedia data is initiated by the subscriber B 120 and, hence, the capability discovery is initiated by the subscriber B 120 the subscriber B 120 is not aware of the identity of the subscriber A 110. The capability discovery is transmitted to the mobile communication network 130 which may be configured to detect that an identity of the subscriber A 110 whose capability is to be determined is missing from the capability discovery request and for this reason the mobile communication network, i.e. a network element therein managing the capability discovery requests, may be configured to inquire an identity of the subscriber A 110 from the server 140. The mobile communication network 130 may be configured to include a parameter, such as the identity of the subscriber B 120 or any other identifier, in the capability discovery request. In response to a receipt of such an inquiry the server 140 may be configured to determine an identity of the subscriber A 110 through an inquiry to data storage storing the data record identifying the call connection request and the parties in it i.e. the subscriber A 110 and the subscriber B 120. The data storage may be configured to return the identity of the subscriber A 110 to the server, which forwards the information to the mobile communication network which is configured to perform the capability discovery towards the subscriber A 110. The subscriber A 110 may be configured to respond to the capability discovery request, wherein information on the outcome of the capability discovery of the subscriber A 110 may be provided to the server 140 and the subscriber B 120. In other words, the response to the capability discovery request may comprise an indication if the subscriber A 110 supports a multimedia content sharing or not. The step 220, as schematically illustrated in FIG. 2, may be voluntary step at least in some embodiments and to indicate this it is illustrated with dashed line in FIG. 2. Hence, if the step 220 is not performed, and e.g. the capability of the subscriber B 120 may be known in any other manner, the next step after the establishment of the call connection 210 may be an establishment of the multimedia session 230, which step is described in the following.

As regards especially to an implementation in which the subscriber A 110 initiates the capability check towards the subscriber B 120 in a context of a call setup there may be a need to arrange a further functionality for combining the capability check to a prohibition to publish the identity of the subscriber A 110 to the subscriber B 120. This is because the subscriber B 120 may end up to a situation that it cannot combine the capability check to a signaling for setting up the call, because the identity of the subscriber A 110 shall be kept hidden from the subscriber B 120. For solving the situation the server 140 may be configured to generate a signal to the subscriber B 120 for indicating that the incoming call in the subscriber B 120 relates to a capability check performed earlier, or concurrently in part. For this purpose a common identifier may be included in the capability check and in the signaling of the incoming call which is indicated in the signaling to the subscriber B 120. Alternatively or in addition, the relation between the capability check and the incoming call may be time-dependent i.e. it is defined that the mentioned operations shall happen within a predetermined time window in order to continue the process for sharing multimedia data in the context of call setup.

Next, some further steps of the present invention are described with an assumption that the subscriber A 110, and thus the both parties, supports the multimedia data sharing. Namely, in response to the outcome that both parties support the multimedia data sharing one of the parties may initiate sharing of the multimedia data by indicating that to the network 130 with an applicable request in order to establish a multimedia session 230 together with the voice call connection session 210. The sharing request may advantageously be conveyed to the server 140 from the mobile communication network 130, which server 140 may be configured to manipulate the multimedia data sharing request so that it is configured to define itself as a destination of the multimedia data. Hence, if the request is received from the subscriber A 110 the server 140 may be configured to define itself as the destination instead of the identity of the subscriber A 110, and in that manner to transmit the multimedia data sharing request to subscriber B 120. The subscriber B 120 may be configured to respond by accepting the sharing in the described manner. On the other hand, if the multimedia data sharing request is received from the subscriber B 120 the server 140 may be configured to acknowledge the request by generating an answer that the server 140 may operate as the destination to the multimedia data shared by the subscriber B 120. In the described manner the server 140 may be configured to establish the multimedia session 230 so as to maintain the identity of the subscriber A 110 hidden from the subscriber B 120 also within the multimedia data sharing. The both parties, i.e. the subscriber A 110 and the subscriber B 120, and at least one of them, may share multimedia data in such manner that both parties see the server 140 as the destination address for the multimedia data to be delivered, but the server 140 may be configured to deliver, or forward, the received multimedia data to the other party. In other words, the server 140 may be configured to coordinate the delivery of the multimedia data in the session by determining the receiving party of the multimedia from data record defining the parties of the multimedia data sharing session.

As a result of the method as schematically illustrated in FIG. 2 the subscriber A 110 and the subscriber B 120 are involved in a communication session in which both a voice call connection and a multimedia data session are established in such a manner that the identity of the subscriber A is maintained hidden from the subscriber B 120.

In the following, some further aspects according to some embodiments of the invention are described. As is derivable from above at least one aim of the present invention is to establish a communication session comprising a voice call connection and a multimedia sharing session between a subscriber A 110 and a subscriber B 120 in such a manner that an identity of the subscriber A is not disclosed to the subscriber B during the communication session. First, the voice call connection may be established between the parties by performing, by a server 140 in response to a receipt of a voice call connection request from the subscriber A 110, at least one operation for preventing the disclosure of the identity of the subscriber A 110 to the subscriber B 120 in the context of an establishment of a voice call connection. The perform of the at least one operation may comprise a step in which it is detected by the server 140 that the subscriber identity of the subscriber A 110 is not disclosable to the subscriber B 120. The detection may e.g. be based on information carried in the call connection request wherein the call connection request may carry an indicator indicating a privacy of the subscriber A 110 i.e. the subscriber A 110 is willing to maintain the privacy in the communication at least with the subscriber B. According to some embodiment the indicator may be so-called Calling Line Identification Restriction, CLIR. According to another embodiment of the present invention the server 140 may be configured to perform the detection by inquiring information on a privacy of the subscriber A from data storage in response to the receipt of the call connection request. For example, the inquiry may be performed to the data storage by including the identity of the subscriber A 110, such as a MSISDN, in the inquiry, wherein the data storage provides a response indicating if the subscriber A wishes to maintain the privacy or not. In response to a detection by the server 140 that the subscriber A 110 wants to maintain the privacy it may perform an operation that the identity of the subscriber A 110 is removed from the call connection request. This may also cause an establishment of a data record in data storage at least for identifying the subscriber A and the subscriber B as parties of communication. The data record may be accessed in later stage of the communication session establishment. Alternatively or in addition, the server 140 may be configured to perform at least one operation for maintaining the privacy of the subscriber A 110, wherein the operation may comprise a step of confirming that the call connection request carries an indication on the privacy of the subscriber A. The indicator may e.g. be the CLIR. At some point, in response to the establishment of the voice call connection, the server 140 may receive a request from one of the communicating parties to share multimedia data. In response to this the server 140 may be configured to establish the multimedia data sharing session between the subscriber A 110 and the subscriber B 120 so that the multimedia sharing session is established by indicating to the subscriber B 120 that the server 140 is another party of the multimedia data sharing session. In other words, the server 140 may be configured to establish a multimedia sharing session in which it serves as a communicating party to the subscriber A 110 and to the subscriber B 120 which confirms that the identity of the subscriber A 110 is not disclosed to the subscriber B 120. The multimedia data sharing session may e.g. be implemented, or established, with Rich Communication Services, RCS, protocol.

As discussed, in some embodiments of the invention the subscriber B 120 may initiate so-called capability discovery operation in order to determine a capability of the subscriber A 110 to support the multimedia sharing session implemented e.g. with RCS protocol and technology. Hence, the server 140 may receive, e.g. in response to the call establishment, a capability discovery request from the subscriber B 120 for determining a capability of the subscriber A to support the multimedia sharing session. The server 140 may be configured to generate the capability discovery request to the subscriber A 110 in response to a determination of the identity of the subscriber A from one of the following: from the received capability discovery request, from the data record stored in the data storage. The determination of the identity of the subscriber A 110 may be necessary because the subscriber B 120 is not necessary aware of the identity of the subscriber A 110 and the capability discovery request does not necessarily carry the identity of the subscriber A 110. This is dependent on the implementation of the invention and for that reason the identity of the subscriber A 110 is determined. The server 140 may receive a response from the subscriber A 110 indicating the capability wherein the server 140 may be configured to generate a capability response towards the subscriber B 120 indicating the capability of the subscriber A to the subscriber B by not including the identity of the subscriber A to the generated capability response. This may be achieved e.g. by providing only an acknowledgement to the subscriber B 120 which carries an indication if the subscriber A 110 supports or not the multimedia data sharing session e.g. with a certain technology. The acknowledgement may also carry an identifier which may link the response to the request originated from the subscriber B 120. For example, the capability discover may be performed for determining the capability of the subscriber A 110 to support Rich Communication Services, RCS, protocol.

Figure 3:
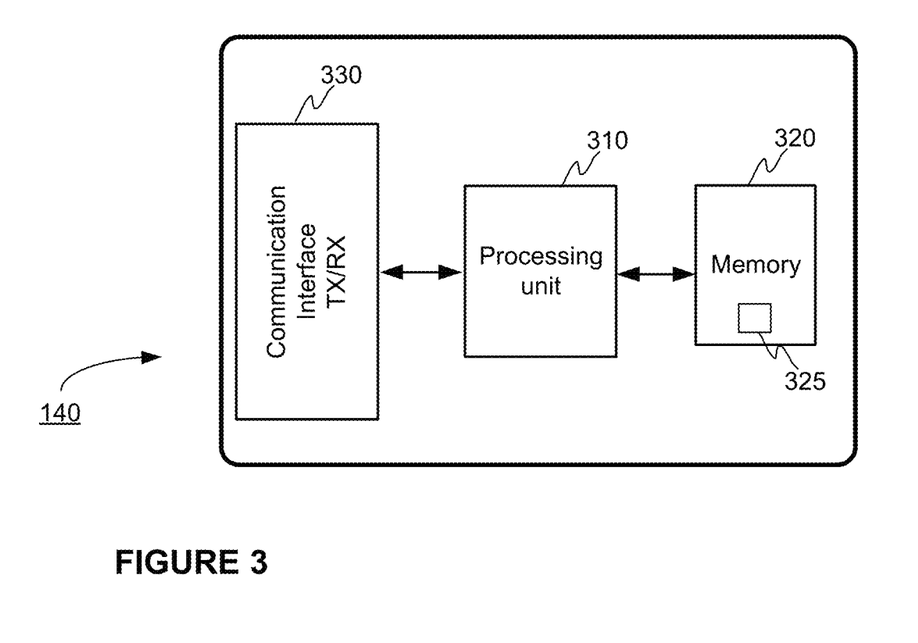
FIG. 3 illustrates schematically a network node according to an embodiment of the invention.

FIG. 3 illustrates schematically a network node, such as a server 140, implementing at least some of the method steps according to an embodiment of the invention. The server 140 may be communicatively coupled to other entities with either wired or wireless communication technology implemented by a communication interface 330 of the server 140. The communication interface 330 may comprise necessary hardware and software components, such as a modem, for implementing the communication. Furthermore. the server 140 may comprise a processing unit 310 comprising one or more processors for performing at least some of the method steps as described. The processing unit 310 may be configured to generate the operational instructions causing the server 140 to operate accordingly by executing portions of computer program code 325 stored in a memory 320 of the server 140.

In FIG. 3 it is indicated that the server 140 is implemented with one entity configured to perform at least some of the method steps. However, the implementation of the server 140 may be performed in a distributed manner by a plurality of separate operating entities or functionalities. According to some embodiment the invention may be implemented so that a portion of the method, such as management of the connection is performed with one server, such as a server implementing communication in the communication network 130. For example, the server may be so-called IP Multimedia System (IMS) server whereas the functionality, or task, relating to the maintenance of the privacy of the subscriber A is arranged with a service proxy configured to implement the task. The IMS server and the service proxy are communicatively coupled to each other for implementing the invention as described.

Figure 4:
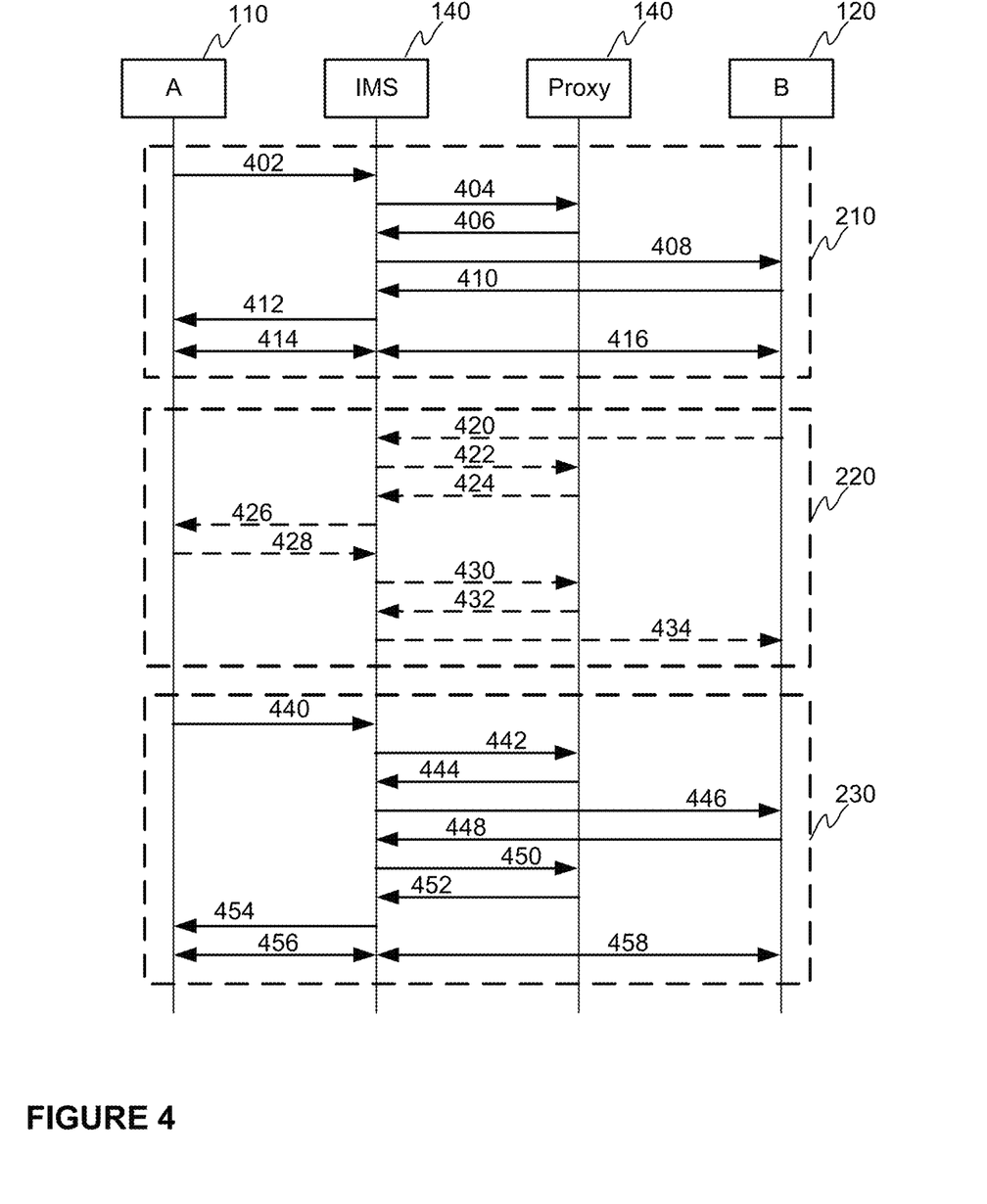
FIG. 4 illustrates schematically a signal flow chart according to an embodiment of the invention.

FIG. 4 illustrates schematically an embodiment of the invention as a flow chart in which the functionality of the server 140 is implemented in a shared manner between an IMS server and a service proxy. The embodiment as disclosed in FIG. 4 illustrates schematically signaling during the establishment of the voice call connection 210, signaling during the capability discovery 220 and signaling during the multimedia data sharing 230. In the example of FIG. 4 the subscriber A 110 initiates a voice call connection by triggering a voice call connection request 402 towards a communication network wherein it reaches, in the embodiment of FIG. 4, the IMS server may perform a detection, e.g. in the manner as described, that an identity of the subscriber A 110 shall be maintained private with respect to the subscriber B 120 who is the destination party of the voice call connection. In response to the detection the IMS server may be configured to signal information on the parties of communication, such as the identifiers of the subscriber A 110 and the subscriber B 120 (e.g. MSISDNs) to the service proxy, which may be configured to establish a data record storing the information. The service proxy may acknowledge the storing of information to the IMS server. In response to the acknowledgement the IMS server may be configured to perform an operation for preventing the disclosure of the identity of the subscriber A 110 to the subscriber B 120 in the manner as described and generate a voice call connection request 408 accordingly to the subscriber B 120. The subscriber B 120 may answer the call which is indicated to the IMS server with signaling 410 and forwarded to the subscriber A 110 with signal 412 by the IMS server. Finally, the voice call connection may be established between the subscriber A 110 and the subscriber B 120 through the IMS server (signals 414 and 416 in FIG. 4) is such a manner that the identity of the subscriber A 110 is maintained private towards the subscriber B 120.

As mentioned the signaling as schematically illustrated in FIG. 4 also provides insight to the determination of the capability of the subscriber A 110 to support multimedia data sharing 220 e.g. with some specific technology. In the example according to FIG. 4 the subscriber B 120 may generate a capability discovery request 420 to the server 140. Since the subscriber B 120 is not aware of the identity of the subscriber A 110 the identity information of the subscriber A 110 may not be included, in at least some embodiment of the invention, in the signaling 420 and due to detection of the this this the IMS server may be configured to inquire 422 the identity of the subscriber A 110 from the service proxy into which the data record combining the subscriber A 110 and the subscriber B 120 in the communication session in question. The inquiry may be performed with the identity of the subscriber B 120 as an inquiry parameter. The service proxy may be configured to respond 424 with an information of the identity of the subscriber A 110. In an embodiment in which the identity of the subscriber A 110 is carried in the capability discovery request 420 even if kept hidden from the subscriber B 120 in the previous step the inquiry towards the proxy is not necessary. The IMS server may generate the capability discovery request 426 to the subscriber A 110 by using the identity of the subscriber A 110 as the destination address. In response to request 426 the subscriber A 110 may be configured to respond 428 to the server, which is configured to acknowledge 434 the capability of the subscriber A 110 to the subscriber B 120 without an identity of the subscriber A 110 in the acknowledgement 434. Moreover, the IMS server may be configured to inform the service proxy on the capability of the subscriber A 430, which may acknowledge 432 the receipt of information.

If both parties of communication, i.e. the subscriber A 110 and the subscriber B 120, are supporting the multimedia data sharing one of the parties may initiate multimedia data sharing at any time of the communication session. In the example as illustrated in FIG. 4 it is the subscriber A 110 which indicates that it is willing to share multimedia data by generating a sharing request 440 to the IMS server 140. In some embodiment of the invention the sharing request 440 may be forwarded to the service proxy 442 which may be configured to manipulate the sharing request so that the server is set as the party of the multimedia data sharing. The service proxy may return the manipulated sharing request to the IMS server 444 and the IMS server generates the sharing request to the subscriber B 120 with signal 446 which may indicate with signal 448 if the subscriber B 120 accepts the sharing request or not. For the purpose of describing the present invention it is hereby assumed that the subscriber B 120 accepts the sharing request. Now, the response from the subscriber B 120 is provided to the service proxy (signal 450) which prepares a response to the subscriber A 110 so that it indicates that the IMS server is the destination address for the multimedia sharing also to the subscriber A 110. The response 452 may first be returned to the IMS server which may be configured to generate, i.e. create and transmit, the response to the subscriber A 110 (signal 454). In response to this the multimedia data sharing session may be established so that the media is transmitted between the communicating parties via the server (IMS server as indicated in FIG. 4). This signaling is indicated with arrows 456 and 458 in FIG. 4. In some embodiment the sharing of the multimedia data may be done through the IMS server and the service proxy. The multimedia data may be any type, such as video data, image data, document data, textual data, or anything similar sharable over the multimedia data sharing session. The signaling, as schematically illustrated in FIG. 4, enable an establishment of a communication session in which the identify of the subscriber A 110 may be maintained hidden from the subscriber B 120.

Figure 5:
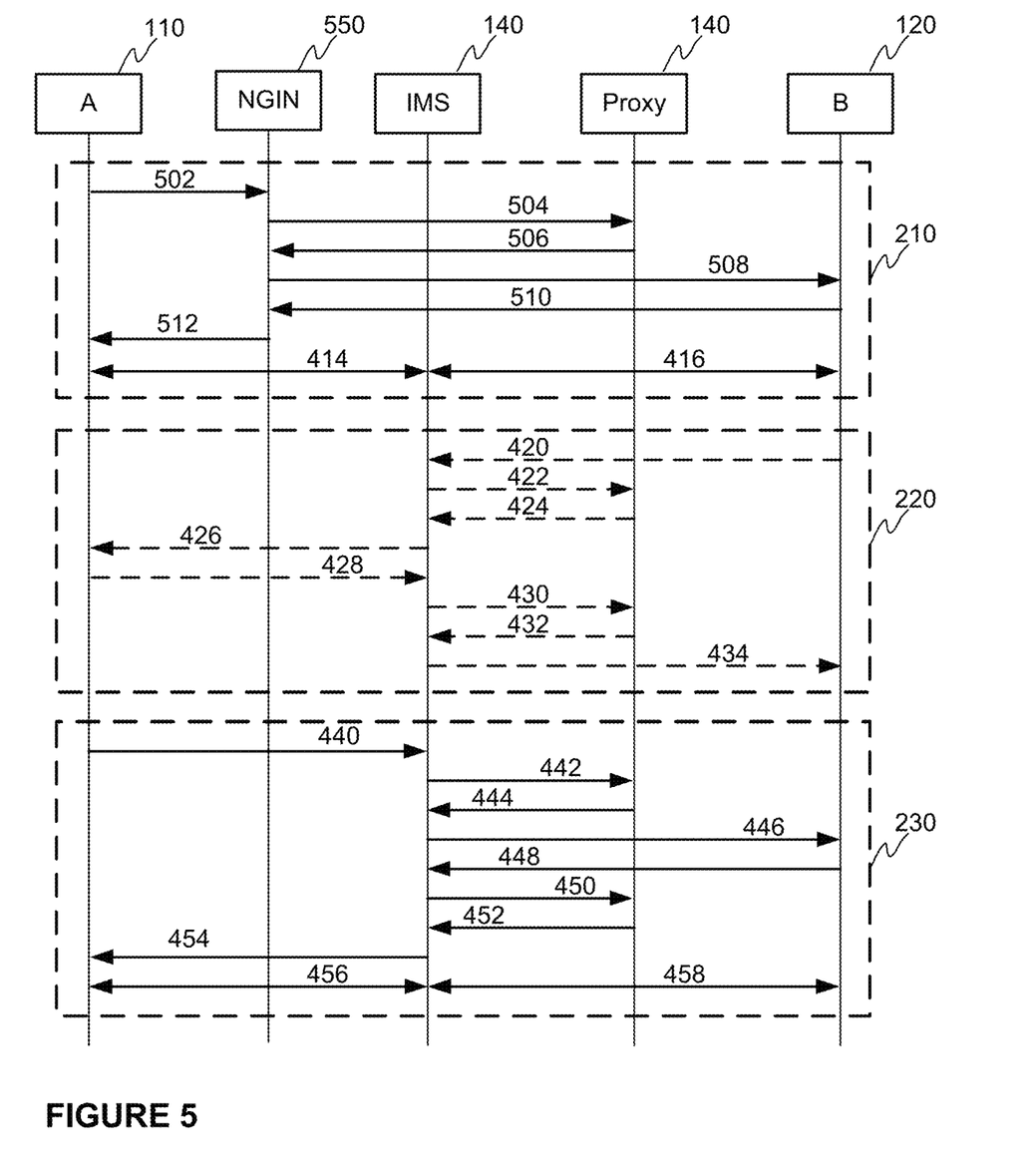
FIG. 5 illustrates schematically a signal flow chart according to another embodiment of the invention.

The embodiment as schematically illustrated in FIG. 4 and described above discusses on the invention when implemented in a communication environment wherein an IP Multimedia Subsystem is applied. Another application area of the invention may be a communication environment in which circuit switched method is used especially for voice call establishment. Such an embodiment is schematically illustrated in FIG. 5. The embodiment as disclosed in FIG. 5 illustrates schematically signaling during the establishment of the voice call connection 210, signaling during the capability discovery 220 and signaling during the multimedia data sharing 230. The signaling during the capability discovery 220 and signaling during the multimedia data sharing 230 correspond to ones as discussed in the context of FIG. 4 as are not repeated here. The signaling during the voice call connection establishment may start by triggering of an establishment of a voice call connection with a voice call connection request 502 by the subscriber A 110 towards a communication network wherein it reaches, in the embodiment of FIG. 5, an intelligent network 550 (NGIN—Next Generation Intelligent Network). The intelligent network 550 may be configured to perform voice call related tasks and it may indicates the call 504, e.g. with a http messaging, to a service proxy e.g. in response to a detection, e.g. in the manner as described, that an identity of the subscriber A 110 shall be maintained private with respect to the subscriber B 120 who is the destination party of the voice call connection. For example, the intelligent network may e.g. signal information on the parties of communication in the signaling 504, such as the identifiers of the subscriber A 110 and the subscriber B 120 (e.g. MSISDNs) to the service proxy, which may be configured to establish a data record storing at least portion of the received information. The service proxy may acknowledge 506 the storing of information (i.e. receipt of information) to the intelligent network 550. In response to the acknowledgement 506 the intelligent network 550 may be configured to perform an operation for preventing the disclosure of the identity of the subscriber A 110 to the subscriber B 120 in the manner as described and generate a voice call connection request 508 accordingly to the subscriber B 120. The subscriber B 120 may answer the call which is indicated to the intelligent network 550 with signaling 510 and forwarded to the subscriber A 110 with signal 512 by the intelligent network 550. Finally, the voice call connection may be established between the subscriber A 110 and the subscriber B 120 through the IMS system (signals 414 and 416 in FIG. 4) is such a manner that the identity of the subscriber A 110 is maintained private towards the subscriber B 120. Naturally, if the subscriber A is not IMS subscriber, the signaling 414 is implemented with NGIN to the IMS. As mentioned the capability discovery 220 of the communicating parties and the establishment of multimedia data sharing session 230 are similar to the ones discussed in the context of FIG. 4.

In the non-limiting examples of signaling especially in FIGS. 4 and 5 by means of which the present invention may be implemented all necessary element are not disclosed. For example, in order to establish the voice call connection other elements e.g. from a core network side may be needed, like MSC/MME and subscriber registers. They are not disclosed nor discussed in the description of the present invention in more detail especially because a functionality of the present invention does not relate to them.

As discussed above at least some aspects of the present invention relates to a computer program product, which, when executed by at least one processor, may cause a server 140 to perform the method as described above. For avoidance of doubt the mentioned elements being involved in the solution establish a system for enabling a maintenance of an identity of the subscriber hidden from the other subscriber being involved in the communication as a communicating party.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for preventing a disclosure of an identity of a subscriber A to a subscriber B in a communication session comprising a voice call connection and a multimedia data sharing session established between the subscriber A and the subscriber B with support of a server, the method comprising:

detecting, by the server in response to a receipt of a voice call connection request from the subscriber A, an indicator carried in the voice call connection request from the subscriber A that provides an indication for the server to prevent the disclosure of the identity of the subscriber A to the subscriber B, and performing at least one operation for preventing the disclosure of the identity of the subscriber A to the subscriber B in a context of conveying the voice call connection request for an establishment of a voice call connection between the subscriber A and the subscriber B with the identity of the subscriber A not being disclosed to the subscriber B, and subsequent to the establishment of the voice call connection and in response to a receipt of a request to share multimedia data from one of communicating parties and the detection of the indicator in the voice call connection request, establishing the multimedia data sharing session, by the server, between the subscriber A and the subscriber B, the multimedia data sharing session is established by indicating to the subscriber B that the server is another subscriber party of the multimedia data sharing session and the identity of the subscriber A not being disclosed to the subscriber B.

2. The method of claim 1, wherein the indicator is Calling Line Identification Restriction, CLIR.

3. The method of claim 1, wherein the detection is further performed by inquiring a privacy of the subscriber A from data storage in response to the receipt of the voice call connection request.

4. The method of claim 1, wherein the step of performing at least one operation comprises a removal of the identity of the subscriber A from the voice call connection request and establishment of a data record in data storage at least identifying the subscriber A and the subscriber B as parties of communication.

5. The method of claim 4, the method further comprising, in response to the establishment of the voice call connection, a step of subscriber B initiating a capability discovery request and the server receiving the capability discovery request from the subscriber B for determining a capability of the subscriber A to support the multimedia sharing session.

6. The method of claim 5, wherein,
in response to receiving the capability discovery request the server determines the identity of the subscriber A from one of the following: from the received capability discovery request, from the data record stored in data storage,
upon determining the identity of the subscriber A, the server forwards the capability discovery request to the subscriber A for the subscriber A to respond to the capability discovery request with capability information of the subscriber A being provided to the server and the subscriber B.

7. The method of claim 5, the method further comprising, in response to a receipt of a capability response from the subscriber A, indicating the capability of the subscriber A by generating a capability response indicating the capability of the subscriber A to the subscriber B by not including the identity of the subscriber A to the generated capability response.

8. The method of claim 5, wherein the capability of the subscriber A to support Rich Communication Services, RCS, protocol is determined in the capability discovery request.

9. The method of claim 1, the multimedia data sharing session is implemented with Rich Communication Services, RCS, protocol.

10. The method of claim 1, wherein the step of establishing the multimedia data sharing session includes:
the subscriber B initiating a capability discovery request for determining a capability of the subscriber A to support the multimedia sharing session,
the server receiving the capability discovery request from the subscriber B, in response to receiving the capability discovery request, the server determines the identity of the subscriber A from the received capability discovery request and upon determining the identity of the subscriber A, and the server forwards the capability discovery request to the subscriber A, and
in response to the subscriber A receiving the capability discovery request, the subscriber A responds to the capability discovery request with capability information of the subscriber A being provided to the server and the subscriber B, the response provided to the server and the subscriber B not including the identity of the subscriber A.

11. The method of claim 1, wherein the step of establishing the multimedia data sharing session includes:
the subscriber B initiating a capability discovery request for determining a capability of the subscriber A to support the multimedia sharing session,
the server receiving the capability discovery request from the subscriber B,
in response to receiving the capability discovery request, the server determines the identity of the subscriber A from a data record stored in data storage, and upon determining the identity of the subscriber A, and the server forwards the capability discovery request to the subscriber A, and
in response to the subscriber A receiving the capability discovery request, the subscriber A responds to the capability discovery request with capability information of the subscriber A being provided to the server and the subscriber B, the response provided to the server and the subscriber B not including the identity of the subscriber A.

12. A non-transitory computer-readable medium on which is stored a computer program for preventing a disclosure of an identity of a subscriber A to a subscriber B in a communication session comprising a voice call connection and a multimedia data sharing session established between a subscriber A and a subscriber B which, when executed by at least one processor, cause a server to perform the method according to claim 1.

13. A server comprising:
at least one processor; and
at least one memory including computer program code,
the at least one memory and the computer program code configured to, with the at least one processor, cause the server to perform:
a detection, in response to a receipt of a voice call connection request from a subscriber A, an indicator carried in the voice call connection request from the subscriber A that provides an indication for the server to prevent a disclosure of the identity of the subscriber A to a subscriber B, and
at least one operation, in response to a receipt of the voice call connection request from the subscriber A, for preventing the disclosure of an identity of the subscriber A to the subscriber B in a context of conveying the voice call connection request for an establishment of a voice call connection between the subscriber A and the subscriber B with the identity of the subscriber A not being disclosed to the subscriber B, and
subsequent to the establishment of the voice call connection and in response to a receipt of a request to share multimedia data from one of communicating parties and the detection of the indicator in the voice call connection request, establishing a multimedia data sharing session between the subscriber A and the subscriber B, the multimedia data sharing session is established by indicating to the subscriber B that the server is another subscriber party of the multimedia data sharing session and the identity of the subscriber A not being disclosed to the subscriber B.

14. The server of claim 13, wherein the server is further configured to perform the detection by inquiring a privacy of the subscriber A from data storage in response to the receipt of the voice call connection request.

15. The server of claim 13, wherein the server is configured to perform the at least one operation by removing the identity of the subscriber A from the voice call connection request and establishing a data record in data storage at least identifying the subscriber A and the subscriber B as parties of communication.

16. The server of claim 13, wherein the server is configured to perform the at least one operation by confirming that the voice call connection request carries an indication on the privacy of the subscriber A.

17. The server of claim 15, the server further configured to, in response to the establishment of the voice call connection, receive a capability discovery request from the subscriber B for determining a capability of the subscriber A to support the multimedia sharing session.

18. The server of claim 17, wherein the server is configured to forward the capability discovery request to the subscriber A in response to a determination of the identity of the subscriber A from one of the following: from the received capability discovery request, from the data record stored in the data storage.

* * * * *